United States Patent Office 3,161,740
Patented Dec. 15, 1964

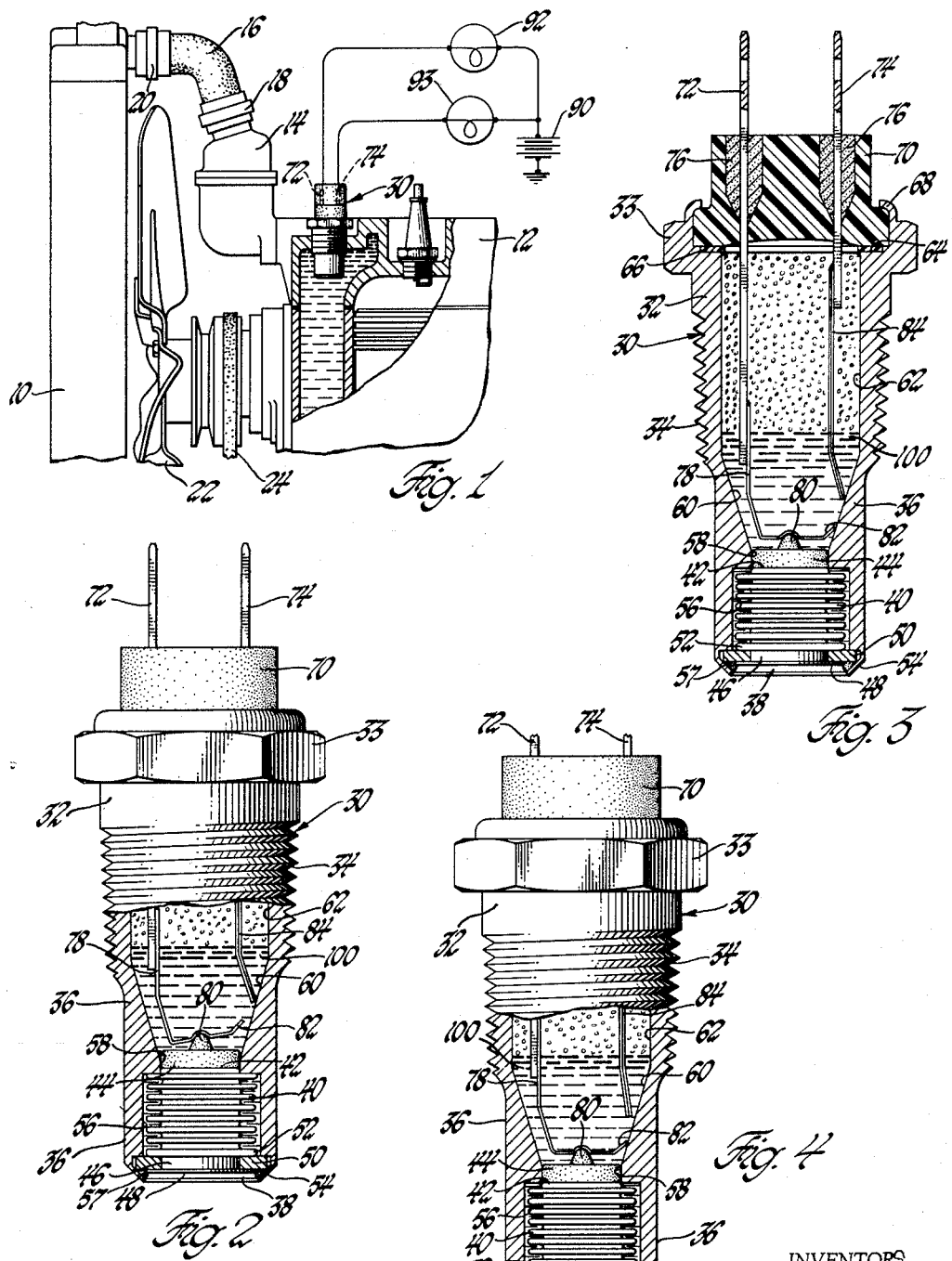

3,161,740
BOILING POINT ANTICIPATOR FOR EFFECTING WARNING SIGNAL
Robert C. Schniers and David L. Van Ostroin, Flint, Mich., assignors to General Motors Corporation, Detroit, Mich., a corporation of Delaware
Filed June 6, 1962, Ser. No. 200,434
7 Claims. (Cl. 200—81)

This invention relates to indicators or signal switches and more particularly to boiling point anticipators for use in indicating the approach of the boiling point or vapor pressure versus temperature curve of a confined or pressurized liquid such as an internal combustion engine coolant.

Modern automobile engines must use pressurized cooling systems because of the limited space available for the radiators and the great increases in horsepower in modern automobile engines. Their cooling systems are sealed by a normally closed pressure cap and the latter prevents loss of coolant by evaporation. It also subjects the radiator to pressure fluctuation. A problem arises in this situation in that when the pressure within a cooling system changes, the boiling point also changes and if the pressure within the system fails by virtue of leakage or otherwise the coolant will boil at a much lower temperature and without activating a thermostatic switch usually provided to give a warning of an unduly high temperature condition. As a mere thermostatic switch operating at a fixed or predetermined temperature or a mere pressure switch is not sufficient, it is preferable to provide some sort of switch such as the anticipator of the present invention which will activate a signal circuit to indicate that the critical temperature at which the coolant will boil is being approached or that an abnormal pressure condition has been attained rendering a mere thermal switch ineffective. In giving a signal before the boiling point of the coolant is attained, possible damage to the engine being served is avoided. Abnormal conditions such as high altitude, a leaky cooling system or a faulty radiator pressure cap would render a mere thermal switch ineffective because the latter would not be activated under reduced pressure conditions to give a warning signal although boiling is taking place.

An object of the present invention is to provide a boiling point anticipator which will indicate that a fluid such as an engine coolant is heated to within a few degrees of its boiling point despite variation in pressure or that the fluid is under abnormal pressure and that steps should be taken to correct the situation before the latter becomes critical.

A feature of the present invention is a casing having a yieldable wall structure enclosing in the casing a secondary fluid having a vapor pressure versus temperature curve substantially conforming with a similar type curve characterizing a first fluid with which the casing is adapted to be placed in heat exchange relation. Another feature of the invention is an anticipator in the form of a simple switch sensitive to both temperature and pressure, this switch having a casing enclosing a non-electrical conducting secondary fluid with the help of a movable wall such as a bellows responsive to the differential pressures of the secondary fluid on one side of the wall and a first fluid such as an engine coolant contacting the other side of the wall, the two fluids preferably having the same as or at least substantially the same vapor pressure versus temperature curves. Another feature is a bi-metal element immersed in non-conductive secondary fluid to establish a signal circuit as to a temperature condition of a first fluid consistent with another signal dependent upon both temperature and pressure of the first fluid.

These and other important features of the invention will now be described in detail in the specification and then pointed out more particularly in the appended claims.

In the drawings:
FIGURE 1 is a part elevation view of an automobile radiator and the forward part of an internal combustion engine with a portion of the engine being shown in section and electrical circuits used with the anticipator of the present invention being diagrammatically illustrated;

FIGURE 2 is an enlarged sectional view of the anticipator or switch as employed in the arrangement of FIGURE 1, contacts therein being open and closed as in normal engine operation;

FIGURE 3 is an elevation view of the anticapator of FIGURE 2 with a portion broken away illustrating the closing positions of contacts during operation of an engine during the approach of a boiling condition of the engine coolant;

FIGURE 4 is a view similar to that of FIGURE 3, but with contacts being in positions assumed when engine coolant is boiling, i.e., when the engine is overheated.

Figure 5:
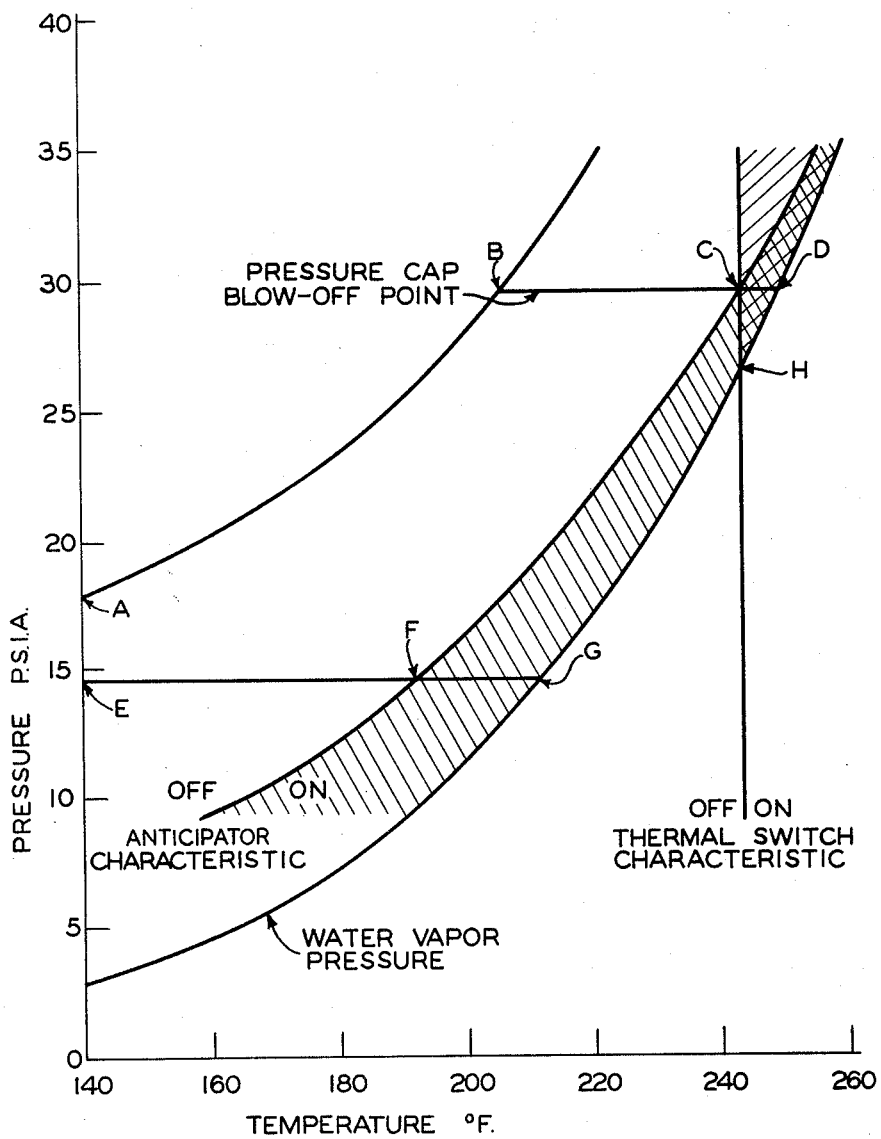
FIGURE 5 shows curves of absolute vapor pressure plotted aganst temperature with reference to merely representative fluids utilized in practicing the present invention.

In FIGURE 1, the engine radiator is shown at 10. The engine is shown at 12 and the cooling jacket thereof is connected by means of a thermostat housing 14, a hose 16, and suitable connections 18 and 20 leading to the top tank of the radiator. A conventional fan 22 is mounted between the engine 12 and the radiator 10 to be driven by a fan belt 24.

Threaded into the top of the engine 12 is an anticipator generally indicated at 30 and which is a main part of the subject matter of the present invention. It comprises a brass casing 32 having a hexagonal section 33 and which is threaded as at 34 for fluid-tight attachment to the head of the engine. The lower end of the casing is somewhat reduced in diameter as at 36 for extending into the coolant within the engine jacket. The lower end of the casing 32 is open as at 38 and retains a bellows 40 characterized by a suitable spring rate so its top 42 will move in proportion to the differential pressure exerted upon it. This bellows is closed at its top 42 to abut a circular and loosely mounted insulator or disk member 44. The other or lower end of the bellows 40 includes a cylindrical portion 46 and a mounting flange 48. An annular ring 50 surrounds the cylindrical portion 46 and is enclosed in fluid-tight relation between the flange 48 and the first convolution 52 of the bellows. The lower peripheral margin 54 of the casing 32 is rolled inwardly tightly to hold the bellows 40 in position within a recess 56 of the casing and sealed by a ring of solder 57. The upper end of the recess 56 is connected to a reduced throat portion 58 of the casing and above this throat portion an inside wall 60 tapers outwardly and upwardly and then merges with a cylindrical inside wall portion 62 which extends upwardly to terminate at an inner shoulder 64 formed on the casing. This shoulder accommodates a sealing washer 66 and the latter cooperates with a rolled-over portion 68 of the casing to retain an insulator block 70. The latter is penetrated by two terminals 72 and 74 each of which is tightly held in place within the block 70 by means of suitable cement 76.

The lower end of the terminal 72 is attached or welded to a resilient contact means or strip 78 and the latter is bent in a modified U form to rest and pivot on a projection 80 integral with the disk member 44. One shorter leg 82 of the member 78 is adapted to rest on the inside end of the casing 32 when the engine is unduly hot as will be further explained below.

The second terminal 74 is shorter than the terminal 72 and it is rigidly joined to the upper end of a bi-metallic contact arm 84. The lower end of this contact arm is in contact with the conical inner wall 60 of the casing within a range of normal engine operating conditions as will further appear.

In the diagrammatic representation of FIGURE 1, the anticipator 30 is shown as having its terminal 72 connected to a battery 90 and in series with a lamp 92. The terminal 74 is connected to a lamp 93 in series with the battery 90.

As stated above, the member 44 is slidable within the throat 58 and the fit of the member 44 is sufficiently loose that a fluid 100 in the casing surrounds the convolutions of the bellows 40. The fluid 100 is so chosen as to have a vapor pressure versus temperature curve preferably the same as or at least substantially conforming with that of the first fluids or engine coolant and this second fluid 100 advantageously may be isopropyl alcohol partly in the form of pure vapor. As the anticipator 30 compares the absolute pressure of the fluid system (engine cooling system) being monitored with the vapor pressure of the fluid 100, care should be used in choosing a suitable fluid 100. It should, as previously stated, have a vapor pressure curve consistent with that of the fluid being monitored. It also should not be subject to freezing when exposed to low ambient conditions. If low temperature is not a problem, water could be used for each of the two fluids. With contacts immersed in the fluid 100, the latter obviously should be non-conductive. It should not react chemically or with other materials it contacts. The casing 32 should be partially filled with enough liquid at the maximum temperature condition to be encountered. This minimum amount is made small to give best thermal response as the anticipator continuously compares the absolute pressure of the engine cooling system with the vapor pressure of pure fluid 100 at the system temperature. Good thermal isolation of the fluid 100 from the atmosphere and strong exposure to heat exchange with the monitored fluid obviously contribute to proper calibration.

Assuming that the engine 12 is operating under normal coolant temperature and pressure conditions and with an adequate supply of engine coolant, the pressure of the engine liquid coolant will be exerted upwardly within the bellows 40 causing the contact means or strip 78 to be distorted into the positions as shown in FIGURE 2. At the same time, the second or bi-metallic arm 84 will be in contact with the surface 60 giving an indication, by illumination of the bulg 93 which may give off a blue light, that the engine temperature is normal. The bulb 92 will not be illuminated as a circuit through that bulb is maintained broken by the pressure of the engine coolant acting within the bellows 40.

Assuming, however, that the temperature of the coolant tends to approach the boiling point of the coolant, the temperature of the second fluid 100 will be increased and with the resultant increase in pressure in the casing 32, the bellows 40 will be slightly compressed so that the strip 78 is permitted to contact the surface 60 as in FIGURE 3 and the bulb 92 (giving off red light) will be lighted at this time. The terminal 74 and the bi-metallic element 84 will still be serving to give a signal and the two bulbs cooperate in indicating an approach to a critical condition. With a further increase in engine temperature, however, the bi-metallic element 84 is so calibrated that it will bend from the surface 60 into a position as indicated in FIGURE 4 and the bulb 93 will go out. The lighting of bulb 92 alone will indicate that a critical condition has not only been approached but has been attained. Bulb 93 will, in general, not go out if boiling occurs at reduced pressure.

It should be noted that actuation of the bulb 92 depends upon the differential pressure exerted by the first (engine coolant) and the second (in casing 32) fluids on the bellows and that such actuation is independent of whether the coolant in contact with the bellows is liquid or vapor. The signal involving the terminal 74 is complementary to the signal derived from the circuit passing through the terminal 72. The two circuits are served because of the nature of the casing 32 in being capable of receiving the contact members 78 and 84 conveniently. Prior to and during installation of the anticipator 30, the bellows 40 is well protected against damage by the rigid wall of the casing shielding it.

Although the bi-metal element 84 operates independent of pressure and is depicted and above-described as a device for effecting a signal that a normal engine coolant temperature obtains in a given situation, it will be appreciated that it may be made and calibrated to make contact upon attaining an abnormal temperature or overheated condition. In such an event the bulb 92 will first give an anticipation signal, assuming that coolant pressure is normal, that the critical temperature is being approached and then both bulbs 92 and 93 will be illuminated if the situation is not remedied and that temperature is reached. If the radiator system has lost its pressure, however, the coolant boiling point will have dropped accordingly and only the bulb 92 will be lighted thereby indicating a loss of coolant pressure or quantity and anticipating a potential overheated engine condition.

In a typical normally closed pressuized automobile cooling system using a radiator cap set for venting at a maximum coolant pressure of about 30 p.s.i. absolute, heating of the system from the cold condition at A (FIG. 5) may continue until the cap vents at B and then, although the pressure remains at about 30 p.s.i.a., the temperature may increase beyond point C until the water coolant temperature reaches 248° F. at D at which the water boils. With the anticipator of this invention installed, however, a warning signal will be given before the boiling temperature is reached and at a temperature of about 243° F. (at point C). If the normally pressurized radiator leaks and pressure is lost, boiling would take place at about 212° F. (at point G) and a mere temperature actuated warning device would be of no effect as it would operate only at 248° F. (as seen in FIG. 5 with the straight line labeled "Thermal Switch Characteristic") or near that level which level is not reached at pressures below that of point H. The anticipator of this invention, however, will give a signal before coolant boiling (as seen in FIG. 5 with the curve labeled "Anticipator Characteristic"). In experiments it has made contact at ambient pressure at 191° F. (at point F.) at least one-half minute before coolant boiling.

The differential pressure required to flex the bellows and operate the contact may be adjusted by changing the contact gap to require more or less deflection. Obviously the vapor pressure versus temperature curve of the fluid 100 may coincide, cross or lie along either side of the vapor pressure versus temperature curve of the engine coolant as the differential pressure acting on the bellows may be positive or negative suitably to make or break contact. The resilient contact arm or the anticipator casing 32 would be altered accordingly. Also the spring rate of the bellows would be chosen in accordance with results desired in a given installation. The shape of the "Anticipator Characteristic" curve in FIG. 5 is determined by the vapor pressure curve of the fluid 100. This characteristic may be shifted up or down by decreasing or increasing the contact gap.

We claim:

1. A boiling point anticipator comprising a conductive casing adapted to be placed in heat transfer relation with a confined fluid subject to boiling, a yieldable wall structure forming a part of said casing and cooperating with the latter in enclosing a non-conductive fluid having a vapor pressure versus temperature curve substantially conforming with that of said fluid in which said casing is adapted to be immersed, a terminal fixed to said casing, and contact means immersed in said non-conductive fluid and connected to said terminal and arranged and adapted to be actuatable by movement of said wall structure to make and break a circuit through said terminal and casing in accordance with a variation in the differential pressure existent at opposite sides of said yieldable wall structure.

2. A boiling point anticipator comprising a conductive casing adapted to be placed in heat transfer relation with a confined fluid subject to heating, a bellows forming a movable wall part of said casing and enclosing a non-conductive fluid within said casing, said non-conductive fluid having a vapor pressure versus temperature curve substantially conforming with a curve representing those characteristics of said confined fluid in which said casing is adapted to be immersed, a terminal fixed to said casing, contact means immersed in said non-conductive fluid and connected to said terminal, said contact means being arranged to be moved by said bellows to make and break a circuit through said casing and terminal in accordance with a variation in differential pressure exerted upon said bellows.

3. A boiling point anticipator such as set forth in claim 2, the interior of said bellows being open to the exterior of said casing, a recess formed in said casing, and said bellows being mounted within said recess and being shielded by said casing.

4. A boiling point anticipator comprising a conductive casing adapted to be immersed in a confined fluid such as a coolant of an internal combustion engine, a recess in said casing, a bellows having an open end fixed in sealed relation to and at one end of said casing and a closed end movable within said recess, a non-electrically-conductive fluid surrounding said bellows within said casing and having a vapor pressure-temperature curve extending generally parallel with a vapor pressure-temperature curve of the fluid in which said casing is adapted to be immersed; a first terminal connected to said casing and insulated from the latter, a resilient contact means immersed in said non-electrically-conductive fluid and connected to said first terminal and movable with said closed end of said bellows, means insulating said contact means from said casing, a second terminal fixed to and insulated from said casing, a bi-metallic element immersed in said non-electrically-conductive fluid and connected to said second terminal, said bi-metallic element being adapted to effect a second circuit through said second terminal and said casing when said casing is subjected to temperature below a predetermined temperature, and the arrangement being such that when the vapor pressure of said non-electrically-conductive fluid rises with respect to the vapor pressure of a fluid outside said casing and with which it is adapted to be contacted said resilient contact means becomes effective to circumvent said insulating means and close a circuit through said first terminal and said casing and when said casing is subject to a temperature above said predetermined temperature said bi-metallic element becomes effective to open said second circuit.

5. A boiling point anticipator comprising a conductive casing adapted to be immersed in a confined fluid, a recess in said casing, a bellows having one end open and fixed to said casing and its other end being closed and cooperating with said casing in resiliently confining a non-electrically-conductive fluid having a vapor pressure versus temperature curve substantially and generally parallel with that of said fluid in which said casing is adapted to be immersed, a terminal extending into said casing and non-electrically-conductive fluid, means insulating said terminal from said casing, resilient contact means immersed in said non-electrically-conductive fluid and connected to said terminal and movable with said closed end of said bellows, and the arrangement being such that when said closed end moves said contact means is adapted to circumvent said insulating means and become effective to make and break a warning circuit by way of said terminal and said casing.

6. A boiling point anticipator comprising a fluid-tight casing in the form of a conductive plug, a wall structure of said casing being yieldable, a non-conductive fluid within said casing and having a predetermined vapor pressure versus temperature curve, a terminal connected to said casing and provided with contact means movable with said wall structure, means insulating said terminal and contact means from said casing, and the arrangement being such that when a differential pressure is exerted upon said wall structure said contact means is adapted to circumvent said insulating means and engage said casing.

7. A boiling point anticipator such as set forth in claim 6, a second terminal fixed to said casing, a bimetallic element immersed in said non-conductive fluid and connected to said second terminal, said bimetallic element being adapted to make and break contact with said casing depending upon a predetermined temperature to which said casing is subjected.

References Cited in the file of this patent

UNITED STATES PATENTS

| | | |
|---|---|---|
| 1,582,872 | McCurdy et al. | Apr. 27, 1926 |
| 1,821,853 | Short | Sept. 1, 1931 |
| 2,550,344 | Goodshalk | Apr. 24, 1951 |
| 3,090,848 | Scholz | May 21, 1963 |